July 28, 1959     H. H. PAYZANT     2,896,677
AIR DRILL

Filed Oct. 4, 1957     2 Sheets-Sheet 1

INVENTOR.
HENRY H. PAYZANT
BY
BUCKHORN, CHEATHAM & BLORE
ATTORNEYS

2,896,677

AIR DRILL

Henry H. Payzant, Portland, Oreg., assignor to Timber Structures, Inc., Portland, Oreg., a corporation of Oregon Application October 4, 1957, Serial No. 688,328

4 Claims. (Cl. 144—104)

My present invention comprises a drill press for a drilling vertical holes in work pieces having horizontal upper surfaces, particularly large work pieces which cannot be easily transported about, such as large laminated wooden beams, rafters, posts and wooden structural members. Such laminated wooden members may be in the order of one hundred feet or more in length and may weigh several tons. These members are usually prefabricated to the extent of drilling holes for anchor bolts or bolts for fastening metal joint members in position. Such bolt holes must be positioned with extreme accuracy and must be true within very close tolerances.

In accordance with prior practices, such holes have been drilled by placing a jig upon the surface to be drilled and clamping it in position, then successively moving a portable drill assembly to the various drill openings through the jig. The portable drills heretofore used have been very heavy since a powerful electric motor is required rapidly to drill a long hole through a large laminated wooden member, thus requiring the mounting of the drill on an overhead crane or other support capable of permitting universal movement of the drill motor and drill bit horizontally while at all times maintaining the drill bit in a perfectly vertical position. Also, it has been customary to use heavy jacks or adjustable cradles upon which to support the beam so that the surface of the beam would be truly horizontal. As a result, the drilling of a set of holes in each end, or in several locations along a large beam, required long labor by several persons and careful checking of all relative relations of the beam with respect to the drill prior to drilling each hole.

It is the principal object of the present invention to provide a light drill press which may be carried about by a single person and rapidly located with respect to each drill point, then rapidly operated to drill each hole, with the certainty that the hole will be true within the required tolerances.

A further object of the present invention is to provide a drill press of the foregoing character which may be operated without fear of deviation of the holes from true and without the use of complicated and heavy leveling devices to support the beam.

A further object of the present invention is to provide a drill press of the foregoing character which is safe to operate in that means are provided to prevent rotation of the drill bit while the drill is being moved from one position to another.

A further object of the present invention is to provide a drill press of the foregoing character in which means are provided rapidly to locate the drill press in in approximate location to a hole to be drilled, and rapidly to make fine adjustments of the drill bit with respect to the location of the hole to be drilled as the tip of the drill bit approaches the surface of the work piece.

The foregoing and other objects and advantages of the present invention will be more readily ascertained from inspection of the following specification taken in connection with the accompanying drawings, in which like numerals refer to like parts throughout.

Figure 1:
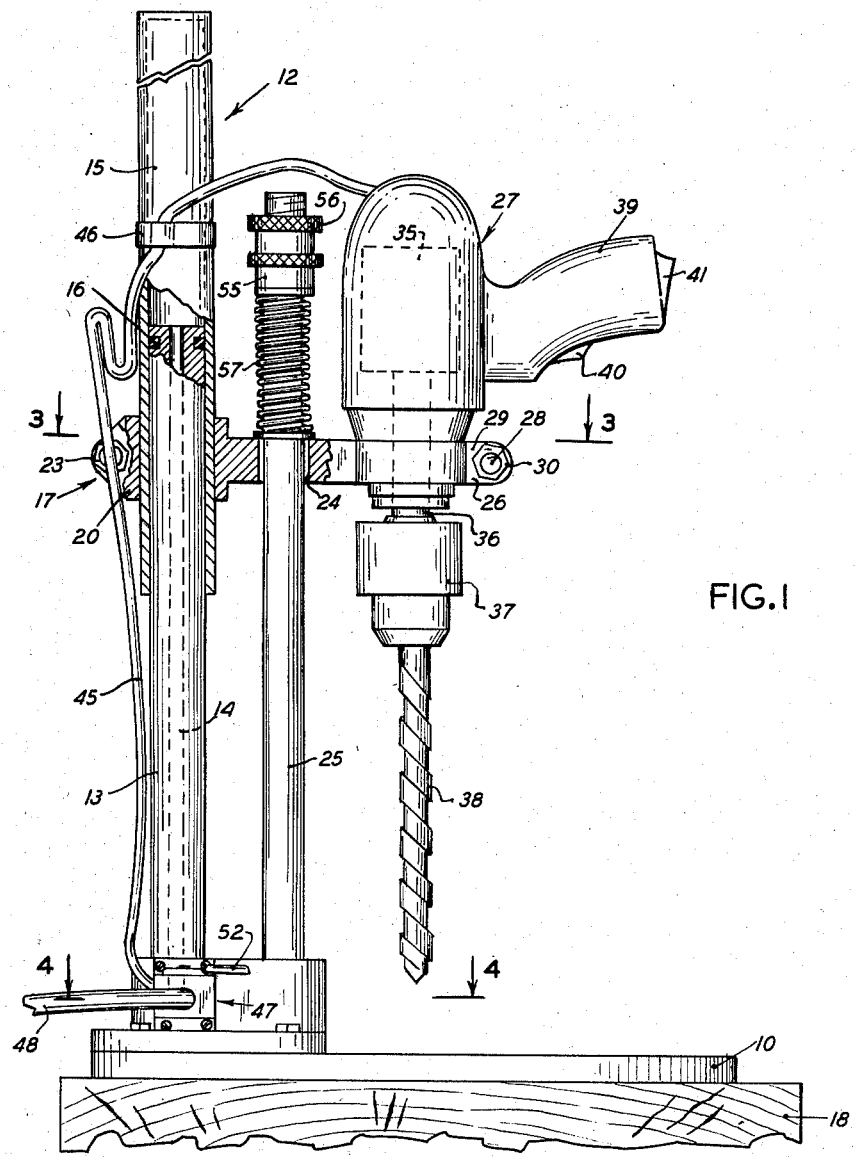
Fig. 1 is a view in elevation, partly in section, of a drill press of the present invention.
Figure 3:
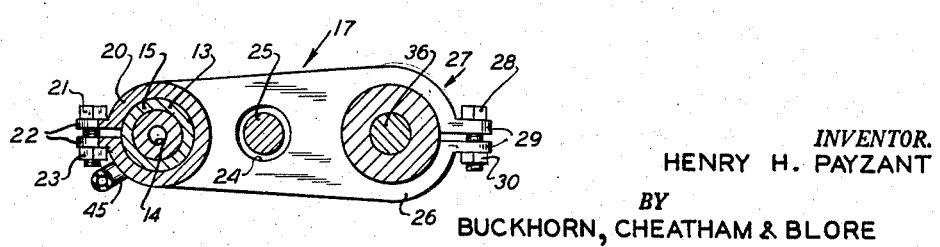
Fig. 3 is a horizontal section taken substantially along line 3—3 of Fig. 1.
Figure 2:
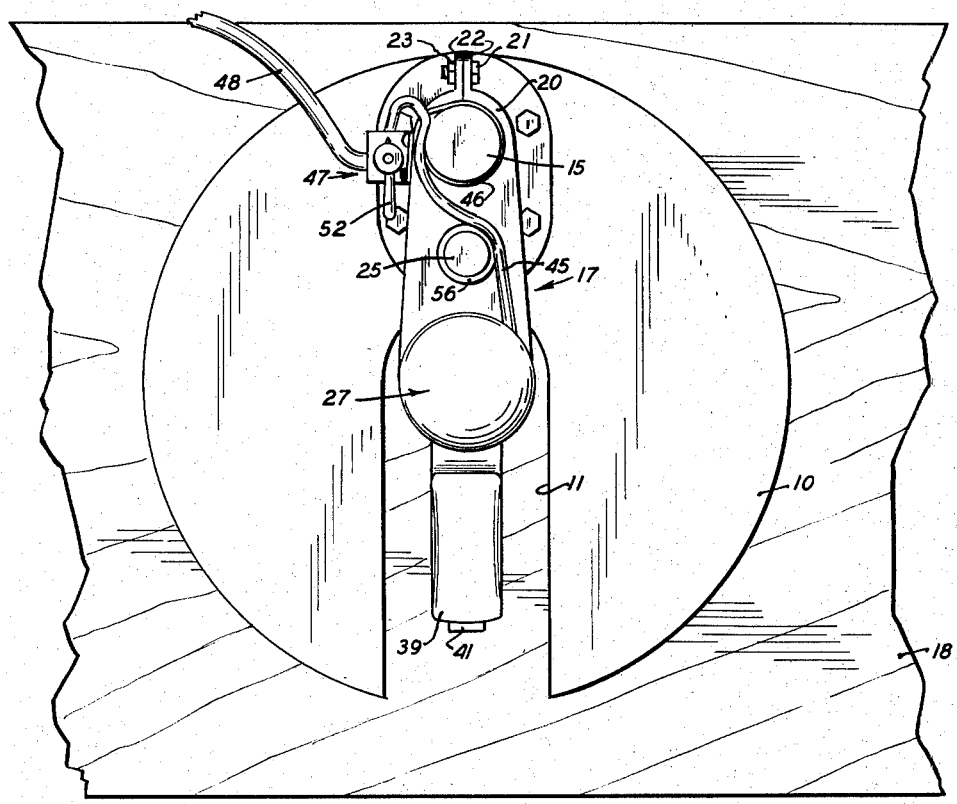
Fig. 2 is a plan view of Fig. 1.

The drill press comprises a base 10 having a flat, smooth, lower surface adapted to be slid about upon the upper suface of the work piece 18 to be drilled. Conveniently the base comprises a metal disk. The base is provided with a sight opening 11 which is preferably in the form of a slot extending from the edge of the base to a central area, the slot being wide so that it is easy to slide the base to an approximate location upon the surface of the work piece.

A piston and cylinder assembly 12 is mounted upon and rises vertically above the base in an area generally in alignment with the slot 11. The piston and cylinder assembly comprises a fixed piston 13 having a longitudinal passage 14 therethrough. The piston 13 is telescoped into a movable cylinder 15 having an internal diameter slightly larger than the external diameter of the piston 13, and the piston 13 carries an O-ring seal 16 adjacent its upper end to provide a fluid tight, sliding joint. The movable cylinder 15 supports a motor mounting bracket indicated generally at 17. The bracket comprises a split sleeve portion 20 encircling the lower part of the cylinder 15 and held in clamped relation thereon by means of a bolt 21 passing through ears 22 on the split sleeve portion and drawn tight by a nut 23. An intermediate portion of the motor mounting bracket is provided with an opening 24 which embraces a guide post 25 fixed upon and extending upwardly from the base 10 parallel to the piston 13. The bracket extends beyond the post 25 and is provided with a motor mounting portion 26 comprising a split sleeve adapted to embrace a pistol grip motor 27, the portion 26 including a clamping bolt 28 fastened through ears 29 and a clamping nut 30. The guiding opening 24 is of larger diameter than the diameter of the post 25, and since the cylinder 15 is free to rotate about the piston 13 the clamp and motor may be moved to a limited extent in an arc about the axis of the piston and cylinder assembly.

Preferably, the motor 27 is an air motor comprising a turbine 35 of well known construction, the turbine driving a shaft 36 which supports a drill chuck 37 extending vertically downward toward the sight opening 11. The chuck holds and drives a drill bit 38 in the usual manner. Preferably, the drill device comprises a pistol grip 39 having a trigger 40 and a trigger lock 41.

Figure 4:
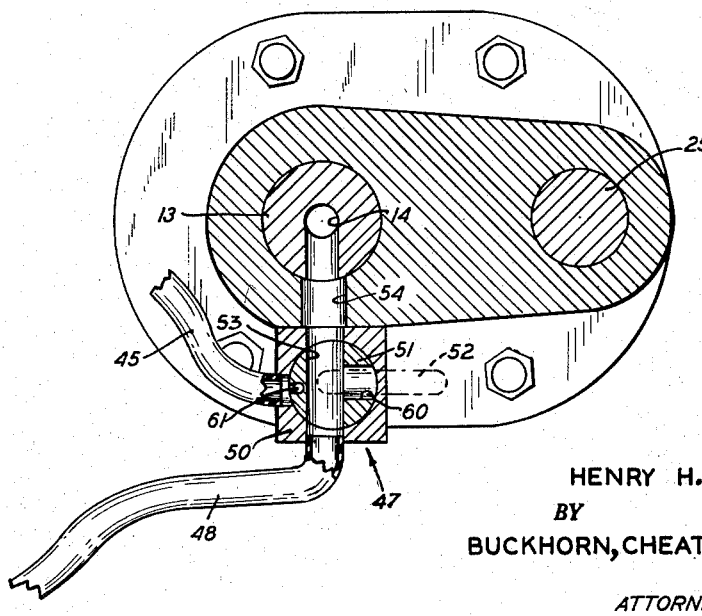
Fig. 4 is a horizontal section on an enlarged scale taken substantially along line 4—4 of Fig. 1.

The turbine is driven in the usual manner by fluid, preferably air, supplied under pressure through a flexible conduit 45 extending upwardly from the base alongside the piston and cylinder assembly and supported by a clamping band 46 adjacent the top of the cylinder 15. The conduit 45 extends upwardly from a two-way valve indicated generally at 47 into which the pressure fluid is admitted from a source of supply indicated by a flexible hose 48 which leads from a conveniently located pump and pressure tank assembly (not shown). The valve comprises a valve block 50 fixed to the base and a valve cylinder 51 mounted therein and rotated by means of a handle 52. The cylinder 51 is provided with a through passage 53 which, when positioned as illustrated in Fig. 4, connects the supply hose 48 to a passage 54 leading to the bottom of the passage 14 through the piston 13. The cylinder 15 with the attached motor and drill are thereby lifted from engagement with the work. The upper end of guide rod 25 carries an adjustable abutment comprising a knurled abutment nut 55 and a knurled lock nut 56 which are both threaded onto threads on the upper end of the guide rod. A buffer spring 57 is coiled about the guide post 25 and rests upon the motor support bracket 17. As the cylinder moves upwardly the buffer spring 57 engages the nut 55 and is compressed to bring the mechanism to a gradual stop without shock. The valve cylinder 51 is provided with a branch passage 60 which may be moved into alignment with the end of the hose 48, thereby shutting off the supply of fluid to the piston and cylinder assembly and admitting fluid into the conduit 45 leading to the turbine. The valve cylinder 51 is also provided with a small, bleed passage 61 which exhausts to atmosphere through the top of the valve assembly, the lower end of the passage 61 opening to the side of the valve cylinder at the level of the passage 54. When air is being admitted to the conduit 45 the bleed passage 61 is in alignment with the passage 54, thereby permitting the slow exhaust of trapped compressed air from the cylinder and the descent of the cylinder toward the work piece. This descent is relatively slow so that as the point of the drill 38 approaches the location mark on the surface of the work piece the drill may be adjusted to exact registry not only by sliding the base 10 but by swinging the drill motor to the extent permitted by the relative size of the opening 24 and the guide post 25.

From the foregoing it will be observed that the turbine is inert when the drill bit is retracted from the work piece so that workmen are not in danger therefrom. Preferably, the trigger 40 is manually operated so that if the drill bit should approach the work in an improper location, the drill may be stopped immediately by releasing the trigger. However, skilled workmen may prefer to lock the trigger 40 in position by depressing the trigger lock 41 in the usual manner.

Having illustrated and described the preferred embodiment of my invention, it should be apparent to those skilled in the art that the same permits of modification in detail and arrangement. I claim as my invention all such modifications as come within the true spirit and scope of the appended claims.

I claim:

1. A portable drill press for drilling a vertical hole in a work piece having a horizontally disposed upper surface comprising a base adapted to be slid about upon the upper surface of the work piece and having a sight opening therethrough, a vertically disposed piston and cylinder assembly comprising a piston element and a cylinder element telescoped together, one element of said assembly being fixed to said base and the other element thereof being longitudinally and rotatably movable and guided by the fixed element, a vertical guide post fixed to said base and extending alongside said assembly, a motor mounting bracket fixed to said movable element and including a portion embracing said guide post and a motor mounting portion, a motor mounted on said motor mounting portion, a vertically disposed drill chuck driven by said motor and movable therewith, said drill chuck projecting downwardly toward said sight opening, and a drill bit engaged in said chuck and movable through said sight opening upon relative telescoping movement of the elements of said piston and cylinder assembly.

2. A portable drill press for drilling a vertical hole in a work piece having a horizontally disposed upper surface comprising a base having a flat, smooth, lower surface adapted to be slid about upon the upper surface of the work piece and having a sight opening therethrough, a vertically disposed piston and cylinder assembly comprising a piston element and a cylinder element telescoped together, one element of said assembly being fixed to said base and the other element thereof being longitudinally and rotatably movable and guided by the fixed element, a vertical guide post fixed to said base and extending alongside said assembly, a motor mounting bracket fixed to said movable element and including a portion embracing said guide post and a motor mounting portion, a motor mounted on said motor mounting portion, a vertically disposed drill chuck driven by said motor and movable therewith, said drill chuck projecting downwardly toward said sight opening, a drill bit engaged in said chuck and adapted to be moved through said sight opening upon relative telescoping movement of the elements of said piston and cylinder assembly, an adjustable abutment at the top of said vertical guide post, and a buffer spring surrounding said guide post and disposed between said abutment and said motor mounting bracket.

3. A portable drill press for drilling a vertical hole in a work piece having a horizontally disposed upper surface comprising a base having a flat, smooth, lower surface adapted to be slid about upon the upper surface of the work piece and having a sight opening therethrough, a vertically disposed piston and cylinder assembly comprising a piston element and a cylinder element telescoped together, one element of said assembly being fixed to said base and the other element thereof being longitudinally and rotatably movable and guided by the fixed element, a vertical guide post fixed to said base and extending alongside said assembly, a motor mounting bracket fixed to said movable element and including a portion embracing said guide post and a motor mounting portion, a motor mounted on said motor mounting portion, a vertically disposed drill chuck driven by said motor and movable therewith, said drill chuck projecting downwardly toward said sight opening, a drill bit engaged in said chuck and adapted to be moved through said sight opening upon relative telescoping movement of the elements of said piston and cylinder assembly, the portion of said bracket embracing said guide post having an opening therethrough through which said guide post extends, said opening being larger than said guide post whereby limited lateral adjustment of said drill bit may be accomplished by swinging said motor mounting bracket in an arc about the longitudinal axis of said piston and cylinder assembly.

4. A portable drill press for drilling a vertical hole in a work piece having a horizontally disposed upper surface comprising a base having a flat, smooth, lower surface adapted to be slid about upon the upper surface of the work piece and having a sight opening therethrough, a vertically disposed piston and cylinder assembly comprising a piston element and cylinder element telescoped together, one element of said assembly being fixed to said base and the other element thereof being longitudinally and rotatably movable and guided by the fixed element, a vertical guide post fixed to said base and extending alongside said assembly, a motor mounting bracket fixed to said movable element and including a portion embracing said guide post and a motor mounting portion, a motor mounted on said motor mounting portion, a vertically disposed drill chuck driven by said motor and movable therewith, said drill chuck projecting downwardly toward said sight opening, a drill bit engaged in said chuck and adapted to be moved through said sight opening upon relative telescoping movement of the elements of said piston and cylinder assembly, the portion of said bracket embracing said guide post having an opening therethrough through which said guide post extends, said opening being larger than said guide post whereby limited lateral adjustment of said drill bit may be accomplished by swinging said motor mounting bracket in an arc about the longitudinal axis of said piston and cylinder assembly, said drill motor comprising a turbine, a source of pressure fluid comprising a flexible hose, a two-way valve mounted upon said base and connected to said hose, a passage from said valve to said piston and cylinder assembly, and a flexible conduit leading from said valve to said turbine, said valve being arranged to admit fluid under pressure to said piston and cylinder assembly and simultaneously shut off the flow of fluid to said turbine, or to shut off the flow of fluid to said piston and cylinder assembly and exhaust said piston and cylinder assembly to the atmosphere and simultaneously admit fluid to said turbine.

References Cited in the file of this patent

UNITED STATES PATENTS

| | | |
|---|---|---|
| 966,217 | King | Aug. 2, 1910 |
| 2,430,019 | Jenkins | Nov. 4, 1947 |
| 2,629,411 | Jones | Feb. 24, 1953 |
| 2,805,691 | Medal | Sept. 10, 1957 |